(12) United States Patent
Koenig

(10) Patent No.: US 8,208,248 B2
(45) Date of Patent: *Jun. 26, 2012

(54) MULTI-TASK INTERACTIVE WIRELESS TELECOMMUNICATIONS DEVICE

(75) Inventor: Eric Koenig, Huntington, NY (US)

(73) Assignee: Koe-Lab, LLC, Huntington, NY (US)

( * ) Notice: Subject to any disclaimer, the term of this patent is extended or adjusted under 35 U.S.C. 154(b) by 823 days.

This patent is subject to a terminal disclaimer.

(21) Appl. No.: 11/601,960

(22) Filed: Nov. 20, 2006

(65) Prior Publication Data

US 2007/0063923 A1   Mar. 22, 2007

Related U.S. Application Data

(63) Continuation of application No. 09/823,300, filed on Mar. 29, 2001, now Pat. No. 7,138,962.

(60) Provisional application No. 60/193,040, filed on Mar. 29, 2000.

(51) Int. Cl.
*G06F 1/16* (2006.01)
(52) U.S. Cl. ......... 361/679.04; 361/679.01; 361/679.02; 379/433.01; 379/433.04; 455/550.1; 455/566
(58) Field of Classification Search ................... 345/1.1, 345/1.2, 1.3, 2.1, 2.2, 2.3, 55, 84, 87, 156, 345/168, 169, 905; 455/550.1, 566, 575.1, 455/ 575.3, 575.4; 361/679.01, 679.02, 679.04, 361/679.06, 679.07; 379/433.01, 433.04
See application file for complete search history.

(56) References Cited

U.S. PATENT DOCUMENTS

| | | | | |
|---|---|---|---|---|
| 6,069,593 A * | 5/2000 | Lebby et al. | .................... | 345/1.1 |
| 6,327,482 B1 * | 12/2001 | Miyashita | ..................... | 455/566 |
| 6,343,006 B1 * | 1/2002 | Moscovitch et al. | .... | 361/679.04 |
| 6,859,219 B1 * | 2/2005 | Sall | ................ | 345/1.1 |
| 7,138,962 B2 * | 11/2006 | Koenig | ......................... | 345/1.3 |

* cited by examiner

*Primary Examiner* — My-Chau T Tran
(74) *Attorney, Agent, or Firm* — Edwin D. Schindler

(57) ABSTRACT

A portable wireless telecommunications device has electronic computer visual display includes at least one central display screen and at least two additional screens respectively disposed foldably to the right and left of said central screen, for displaying simultaneous, multiple images to a user in a super video graphics array (SVGA). The foldable display has at least two mutually connected foldable sub-display units, and it includes a user attachable and detachable connector, for user-assembling of the sub-display units into mutual connection with each other. Each of the two sub-display units have user-deployable supports (e.g. a rigid angular support member) for maintaining the sub-display units in an upwardly projecting disposition during use.

16 Claims, 5 Drawing Sheets

MULTI-TASK INTERACTIVE WIRELESS TELECOMMUNICATIONS DEVICE

RELATED APPLICATIONS

This is a continuation of Application Ser. No. 09/823,300, filed Mar. 29, 2001, now U.S. Patent No. 7,138,962 B 2, which claims domestic priority, pursuant to 35 U.S.C. §119 (e), from Provisional Application Ser. No. 60/193,040, filed Mar. 29, 2000.

FIELD OF THE INVENTION

The present invention is directed to a multi-task interactive wireless telecommunications device, such as a cellular telephone, with multiple user-controlled displays. The multi-task display may also be a miniature computer accessory, such as a wireless personal digital assistant, palm organizer or Web-based cellular telephone for accessing several tasks simultaneously.

BACKGROUND OF THE INVENTION

Because of their small size, the Liquid Crystal Display (LCD) screen of a wireless cellular telephone, are limited in what they can display. Before now, there has not been such a device which provides multiple viewing images straight ahead and obliquely on each side.

Frequently a cell phone, may have multi-tasks to be accomplished while using a cell phone, such as talking and also checking e-mail or Internet services. Traditionally the user sequentially accesses each of the tasks separately.

Furthermore, Web based cellular telephones are known, but their use is limited by the small screen size of the built-in liquid crystal display thereon.

OBJECTS OF THE INVENTION

It is therefore an object of the present invention to provide a wireless telecommunications unit, such as a cellular telephone, with a central screen located straight ahead and side screen wings located obliquely on each side.

It is therefore an object of the present invention to provide a cellular telephone with user-variation of displays.

It is yet another object of the present invention to provide an electronic visual display including at least one central display screen and at least two additional screens respectively disposed foldably to the right and left of said central screen.

It is yet another object of the present invention to allow a computer Internet user to displaying and access multiple displays simultaneously.

BRIEF SUMMARY OF THE INVENTION

A wireless telecommunications unit with an electronic visual display includes at least one central display screen and at least two additional screens respectively disposed foldably to the right and left of the central screen, for displaying simultaneous, multiple images to user.

In one embodiment the centrally disposed display is a monitor attached to alternate right and left displays by hinged attachments, such as by mortise-and-tenon-style plug-in tab-into-matching-aperture attachments or by hinged attachments.

This embodiment may be miniaturized in a hand-held computerized multi-media display cellular telephone with one or more foldable displays for displaying images to a game player.

This hand-held body has a keypad for input from a user; and a visual, and audio displays. This small cell phone may have a central display screen and at least two additional screens respectively disposed foldably or slidably to the right and left of the central LCD screen.

The cell phone includes sound-producing amplifiers.

Moreover, the oblique right and left computer display screens may be attached hingedly to the body of the cell phone. In this case, the hingedly attached right and left screens fold between an outward deployed position and an inward storage position.

The right and left computer display screens may also be attached slidably with a spring-deployment sub-housing within the body of the cell phone, wherein the slidably attached right and left screens slide with urging from the spring-deployment members between an outward deployed position and an inward storage position.

BRIEF DESCRIPTION OF THE DRAWINGS

The present invention can best be understood in conjunction with the accompanying drawings, in which.

DETAILED DESCRIPTION OF THE PREFERRED EMBODIMENTS

Figure 1:
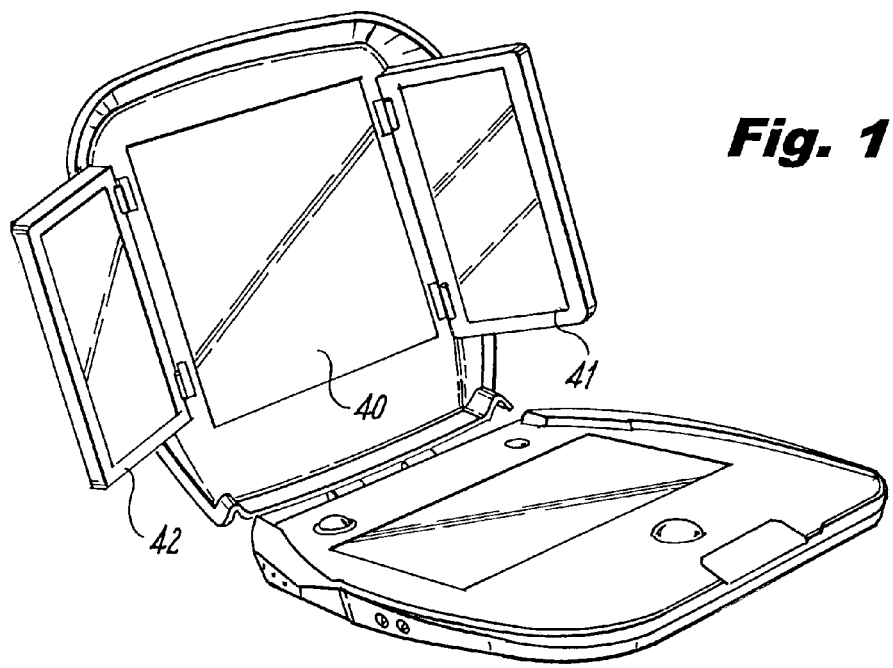
FIG. 1 is a Perspective view of a wireless telecommunications unit embodiment utilizing integral rotating secondary screens.
Figure 2:
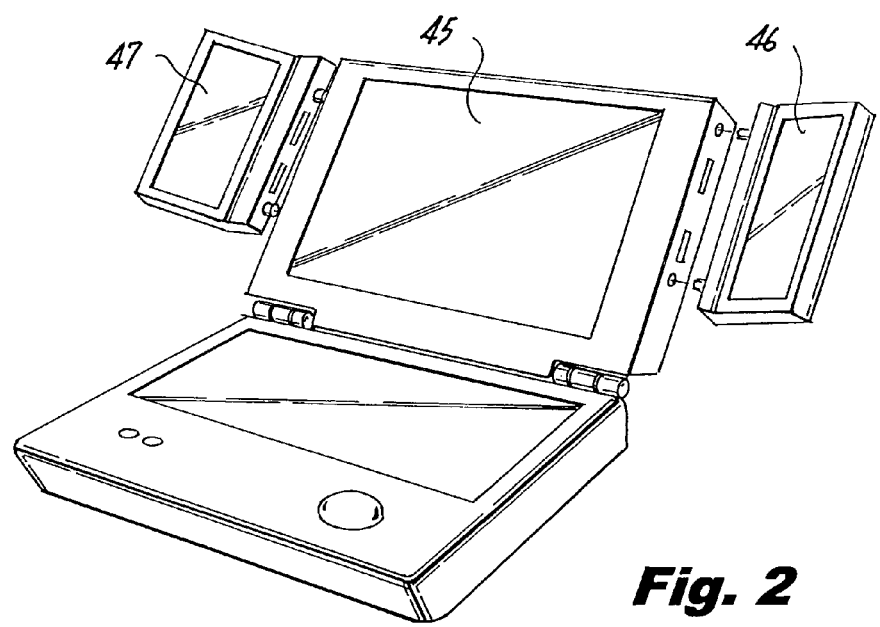
FIG. 2 is a Perspective view of wireless telecommunications unit a utilizing plug-in separate accessory screens.

FIGS. 1 and 2 show embodiments of a foldable wireless telecommunications device, such as a cell phone or other two-way wireless device which uses three separate flat screen displays (such as LCD's).

In FIG. 1 central display screen 40 is flanked by side screens 41 and 42 which swing out from the sides of screen 40 on hinges.

FIG. 2 shows an alternate embodiment wherein the smaller side screens 46 and 47 are removable, but they plug into central screen 45 for use wherein they are at a fixed angle.

Figure 3:
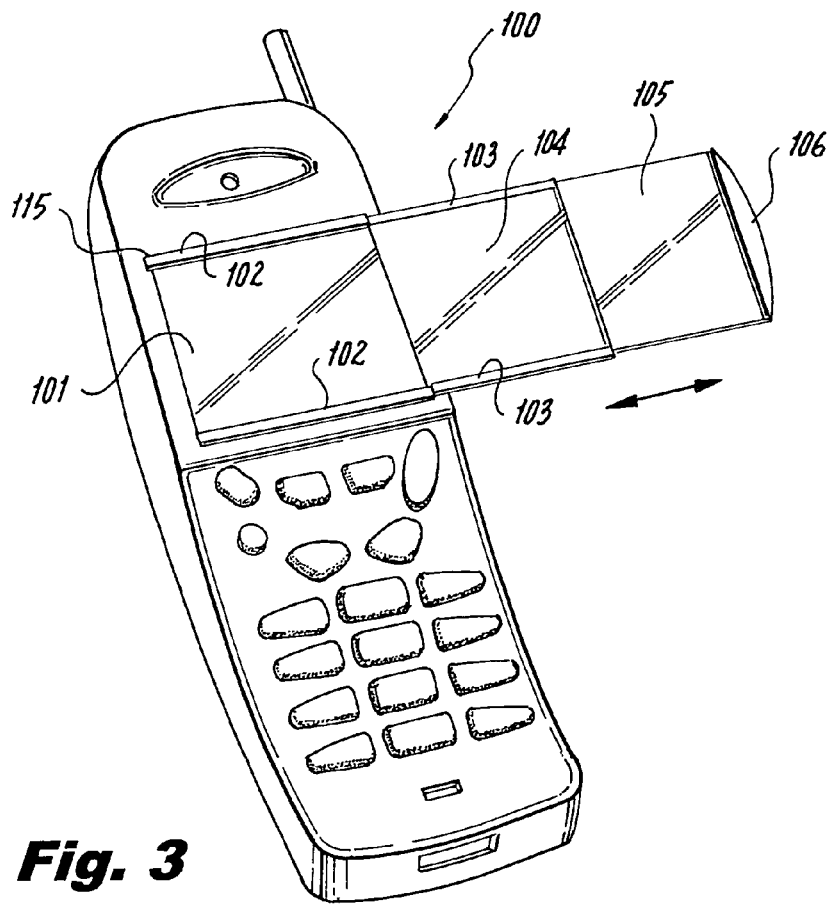
FIG. 3 is a Perspective view of an enhanced cell phone with multiple screens deployed.
Figure 4:
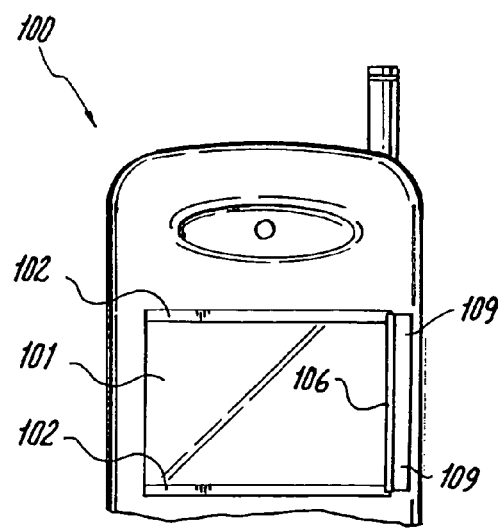
FIG. 4 is a Top view of an enhanced cell phone with single screen in use.

FIGS. 3 and 4 show two views of cell phone 100 equipped with three LCD panels which store on top of one another (see FIG. 4) and can be deployed in an ergonomic manner with one hand. Panel 101 is in a fixed position relative to the housing and it is wired permanently at edge 115. Track 102 on the top and bottom guides second panel 104 to pull out and then rise into a co-planar position with screen 101.

Similarly, track 103 on screen 104 guides screen 105 to pull out further and rise into a co-planar position with screen 104. The set-up is a one-handed operation from the configuration of FIG. 4 by grasping handle 106 and pulling out in one sweeping motion. Then a slight straight push back operates connectors at 116 and 117 so that the three panels have almost negligible separation between panels.

To store the two extra panels, the user simply re-extends to separate the connectors and tilt slightly up as the panels are manually pushed back. The tracks guide the panels back into storage position. Note that the single screen can be used for short messages.

With the three screens deployed, the full width of an SVGA display can be read albeit at reduced height. Simple scrolling can then be used to view normal screen contents in a near normal format. Configurations with from two to five panels are practical. Instead of being co-planar, the screens may be observable obliquely when hingably moved out in a configuration similar to the previous embodiments for a computer multi-task screen display assembly.

In the embodiments shown in FIGS. 1 through 4, with multiple attached screens, each screen element (such as 40,41 and 42 of FIG. 1, 45,46 and 47 of FIG. 2 or 101, 104 and 105 in FIG. 3) may have its own driver electronics, or be centrally controlled. The display content of each of the screens is determined by the controlling software as by the graphic or text numeric pixel image data accumulated in a screen image buffer associated with each of the screens. A typical example of image software is ADOBE ACROBAT® among others known to those skilled in the art.

In this manner, three distinct but related functional images can be displayed, or a continuous graphic panoramic view (or wide text segment) can flow from the left-most screen across the center screen and then to the right screen element. This is completely under software format control, and the assigned function of each screen element can change from one content phase to another within the same application as desired.

While the configurations shown in FIGS. 1 and 2, with substantial gaps between screen elements, are more amenable to the functional image use, a continuous panoramic display here could still closely simulate a continuous image, such as a series of stock quotes, a paragraph of word processing text, a digital photograph or images from a hand held video game, such as the windshield and two side windows of a vehicle, such as a small aircraft cockpit.

Figure 5:
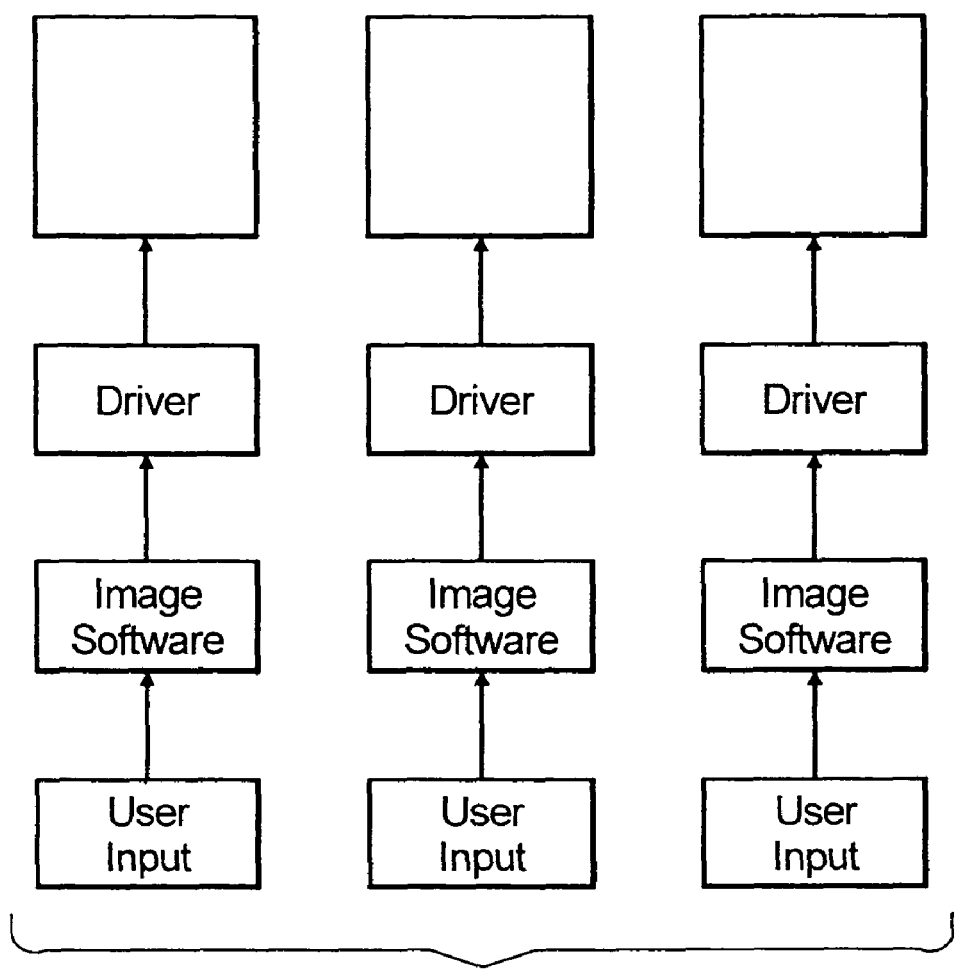
FIG. 5 is a block diagram of one embodiment for a system control for the images electronically displayed in discrete segments.

For example, for the discrete separable images in the block diagram of FIG. 5, a user inputs separate instructions, such as with a mouse, stylus, touch screen or other input device such as known to those skilled in the art, for each screen, so that each screen will have a discrete separate image, wherein each screen has its own driver electronics controlled by imaging software. For example, while the following is illustrative only, a user may have a first image relating to a commercial e-mail communication in one screen, such as stock quotes or sports results. In addition, the user may have a second image relating to an instant message chat communication in another screen. Moreover, the user may have a third image relating to a data display, such as a list of telephone numbers, in a third screen.

Figure 6:
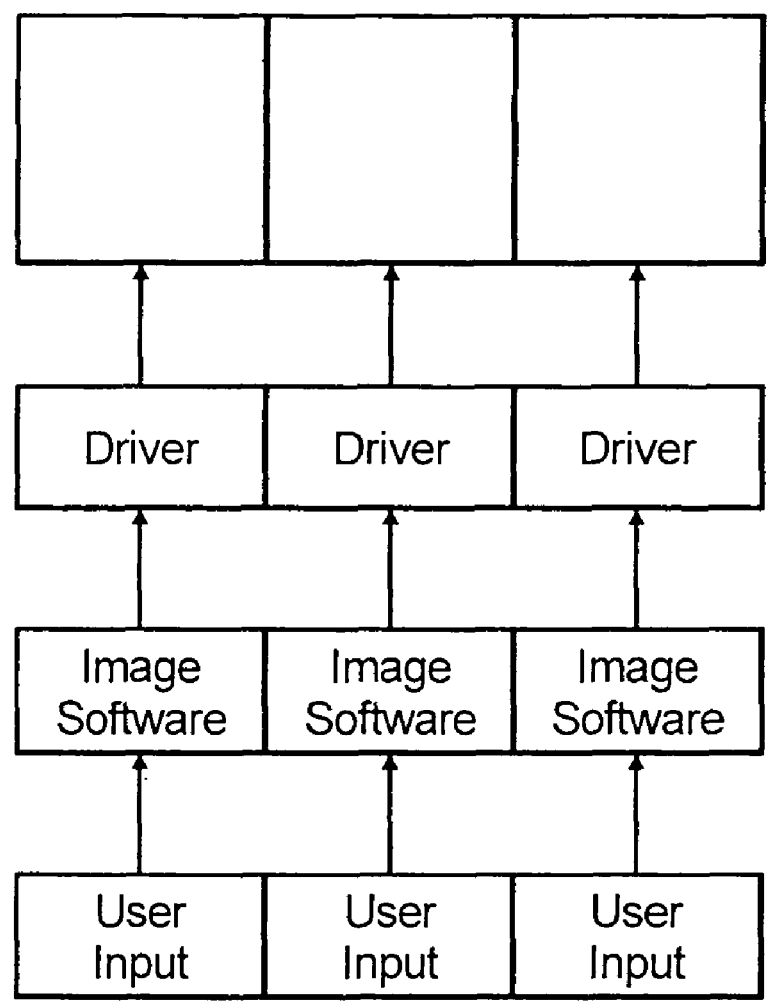
FIG. 6 is a block diagram of another alternate embodiment for a multiple system control for the images electronically displayed in a continuous image.
Figure 7:
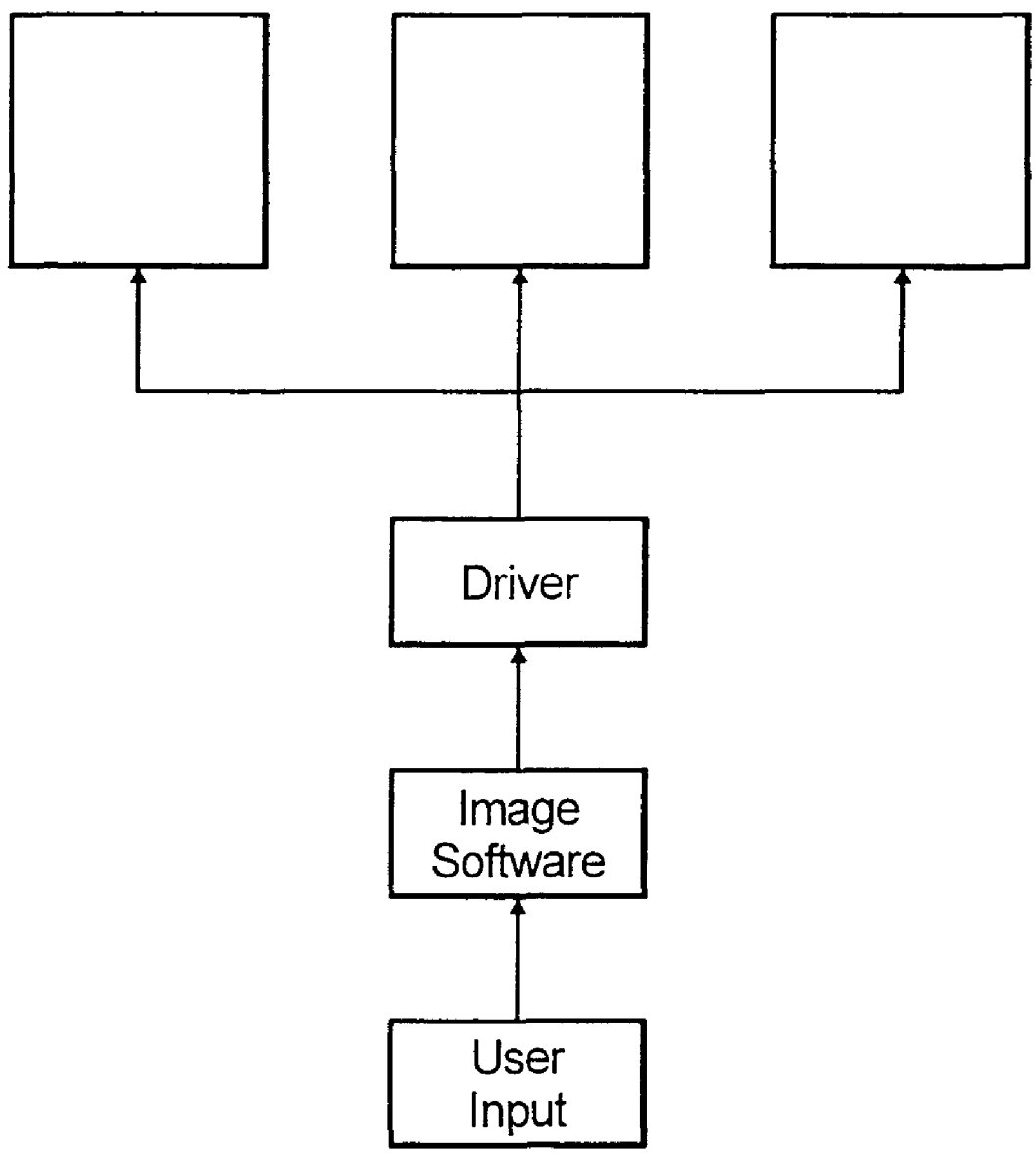
FIG. 7 is a block diagram of a further alternate embodiment for a single system control for the images electronically displayed in a continuous image.

For the continuous images, the block diagrams of FIGS. 6 and 7 may be employed. In FIG. 6, each screen displays a portion of an image, which may be three discrete images, such as the left side, front and right side of an architectural rendering of a building, displayed together. However in FIG. 7, a single image is displayed, such as a paragraph of word processing or messenger text, a series of statistics, such as sports events results, or a wide, panoramic image, such as a single digital photographic image or animated display, whereby the three screens are controlled by a single user input and by a single driver controlled by a unit of image software.

It is further noted that other embodiments and changes may be made to the present invention without departing from the scope of the invention, as noted in the appended Claims.

I claim:

1. A hand-held wireless telecommunications unit displaying images to a user, comprising:
a hand-held body;
a first screen on an upper face of said hand-held body having first and second sides bounding a width of said first screen;
a second screen connected to said hand-held body and proximate one side of said first and second sides of said first screen, said second screen having a first side and a second side with said first side of said second screen being proximate said one side of first screen and said second screen being movable between a first non-deployed position relative to said first screen and a second deployed position, wherein said second screen is positioned to said one side of said first screen when in said second deployed position for forming at least a portion of a continuous screen with said first screen for a full width of a display, said second screen being in said non-deployed position relative to said first screen when said second screen does not form at least a portion of said continuous screen with said first screen; and,
a third screen deployable and connected with said second side of said second screen, said second side of said second screen being a side different from said first side of said second screen.

2. The hand-held wireless telecommunications unit displaying images to a user according to claim 1, wherein said third screen is deploy-able and connected with said second side of said second screen with said second side of said second screen being an opposite side, or a distal side, relative to said first side of said second screen.

3. The hand-held wireless telecommunications unit displaying images to a user according to claim 2, wherein said first screen, said second screen and said third screen, when deployed, form a continuous display for a full width of a display.

4. The hand-held wireless telecommunications unit displaying images to a user according to claim 1, further comprising at least one additional screen deployable and connected to said hand-held body and proximate a side along either the width or length of said first screen.

5. The hand-held wireless telecommunications unit displaying images to a user according to claim 4, wherein said first screen, said second screen, said third screen and said at least one additional screen, when deployed, form a continuous display for a full width of a display.

6. The hand-held wireless telecommunications unit displaying images to a user according to claim 1, wherein said first screen, said second screen and said third screen, when deployed, form a continuous display for a full width of a display.

7. The hand-held wireless telecommunications unit displaying images to a user according to claim 1, wherein said hand-held body includes an input interface.

8. The hand-held wireless telecommunications unit of displaying images to a user according to claim 1, wherein said telecommunications unit is a cellular telephone.

9. The hand-held wireless telecommunications unit of displaying images to a user according to claim 1, wherein said telecommunications unit is a wireless personal digital assistant.

10. The hand-held wireless telecommunications unit of displaying images to a user according to claim 1, wherein said telecommunications unit is a wireless Internet Web based personal electronic organizer.

11. The hand-held wireless telecommunications unit of displaying images to a user according to claim 1, wherein said first screen, said second screen and said third screen are LCD's.

12. A hand-held wireless telecommunications unit displaying images to a user, comprising:

a hand-held body having an input interface;

a first screen on an upper face of said hand-held body having first and second sides bounding a width of said first screen;

a second screen connected to said hand-held body and proximate one side of said first and second sides of said first screen, said second screen having a first side and a second side with said first side of said second screen being proximate said one side of first screen and said second screen being movable between a first non-deployed position relative to said first screen and a second deployed position, wherein said second screen is positioned to said one side of said first screen when in said second deployed position for forming at least a portion of a continuous screen with said first screen for a full width of a display, said second screen being in said non-deployed position relative to said first screen when said second screen does not form at least a portion of said continuous screen with said first screen; and, a third screen deployable and connected with said second screen, wherein said third screen is deployable past a distal side of said second screen and, when deployed, all of said first screen, said second screen and said third screen forming a continuous display for a full width of a display.

13. The hand-held wireless telecommunications unit of displaying images to a user according to claim 12, wherein said telecommunications unit is a cellular telephone.

14. The hand-held wireless telecommunications unit of displaying images to a user according to claim 12, wherein said telecommunications unit is a wireless personal digital assistant.

15. The hand-held wireless telecommunications unit of displaying images to a user according to claim 12, wherein said telecommunications unit is a wireless Internet Web based personal electronic organizer.

16. The hand-held wireless telecommunications unit of displaying images to a user according to claim 12, wherein said first screen, said second screen and said third screen are LCD's.

* * * * *